(12) United States Patent
Mungale

(10) Patent No.: US 7,565,543 B1
(45) Date of Patent: Jul. 21, 2009

(54) SYSTEM AND METHOD FOR AUTHENTICATING A WEB PAGE

(75) Inventor: Ajit S. Mungale, Solon, OH (US)

(73) Assignee: American Express Travel Related Services Company, Inc., New York, NY (US)

(*) Notice: Subject to any disclaimer, the term of this patent is extended or adjusted under 35 U.S.C. 154(b) by 874 days.

(21) Appl. No.: 11/088,623

(22) Filed: Mar. 23, 2005

(51) Int. Cl.
*H04L 9/00* (2006.01)
*G06F 7/04* (2006.01)

(52) U.S. Cl. ........................ 713/176; 340/5.86

(58) Field of Classification Search .......... 340/2.8, 340/5.86, 5.8
See application file for complete search history.

(56) References Cited

U.S. PATENT DOCUMENTS

| | | | |
|---|---|---|---|
| 7,203,838 B1 * | 4/2007 | Glazer et al. ............. 713/176 |
| 7,293,293 B2 * | 11/2007 | Lee et al. ................ 726/30 |
| 2002/0124172 A1 * | 9/2002 | Manahan ................ 713/176 |
| 2006/0041754 A1 * | 2/2006 | Hind et al. .............. 713/176 |

* cited by examiner

*Primary Examiner*—Matthew B Smithers
(74) *Attorney, Agent, or Firm*—Fitzpatrick, Cella, Harper & Scinto

(57) ABSTRACT

A Web page may be authenticated by issuing a Web page request from a browser on a client computer to a Web server, receiving a signed Web page in response to the request, authenticating the signed Web page, and invoking at least one client module associated with the Web server when the authenticating is successful. The at least one client module is adapted for execution on the client computer.

16 Claims, 7 Drawing Sheets

SYSTEM AND METHOD FOR AUTHENTICATING A WEB PAGE

FIELD OF THE INVENTION

The present invention relates to the field of computer science. More particularly, the present invention relates to a system and method for authenticating a Web page.

BACKGROUND OF THE INVENTION

A Web browser or Internet browser is a program used to view HTML (Hypertext Markup Language) documents. A Web browser translates an HTML document comprising one or more HTML codes into the text and graphics displayed when viewing a Web page. Currently the most common Web browser is Internet Explorer® technology-enabled browser, available from Microsoft Corporation of Redmond, Wash. Netscape Navigator is another Web browser and is available from Netscape Communications Corporation of Mountain View, Calif.

Secure Socket Layer (SSL) is commonly-used protocol for managing the security of a message transmission on the Internet. SSL is included as part of both the Microsoft and Netscape browsers and most Web server products. SSL uses the public-and-private key encryption system from RSA Security Inc. of Bedford, Mass., which also includes the use of a digital certificate. A digital certificate is an electronic "credit card" that establishes a user's credentials when doing business or other transactions on the Web. A digital certificate is issued by a certification authority (CA) and typically contains a user's name, a serial number, one or more expiration dates, a copy of the certificate holder's public key, and the digital signature of the certificate-issuing authority so that a recipient can authenticate the sender.

While most websites provide SSL for sensitive data, users may configure their Internet browser to enable or disable SSL. Even if an Internet browser is adapted to enable SSL, a user may choose not to use SSL.

The term "spoof site" is used to describe a Web site created by an imposter with the purpose of tricking computer users into providing private information. Spoof sites are designed to copy the exact look and feel of a "real" site (e.g. http://www.americanexpress.com), but any information entered at the spoof site is received by the imposter, not the creators of the "real" site. After building such a site, the imposter typically sends an email with a message such as "Your account is limited," or "We require additional information," or "Due to a security breach, we need to verify your information." This is known as "phishing."

The phishing email typically includes a link to a website. The website address typically includes character strings that resemble the name of the "real" site (e.g. http://www.americanexpress.com/ ... ), but in fact the email will include a URL containing a series of numbers, a string containing the URL of the "real" site followed by cryptic-looking information, or something that resembles an email address.

If the authentication features of SSL are not enabled, a computer user is unable to distinguish a real website from a spoof site. Users therefore interact with the spoof site, often entering sensitive information such as card numbers, account numbers, personal identification numbers (PIN), passwords, addresses, social security numbers, etc., thereby allowing the imposters access to the sensitive information.

FIG. 1 is a block diagram that illustrates how an Internet Explorer® technology-enabled Web browser processes a Web page received from a Web server. As shown in FIG. 1, a browser 120 receives HTML file 100 from a Web server 160. A pre-parser Web interface 125 of browser 120 converts the HTML codes in HTML file 100 to a canonical format to facilitate parsing of the HTML codes in HTML file 100, and stores the converted HTML file to a persistent storage medium such as a hard disk. The conversion typically includes changes such as inserting missing elements (such as HEAD tags), stripping quotes, capitalizing tag names, and converting open tags to closed tags. Thus the resulting parsed HTML file 150 retrieved by the Web interfaces 125 typically differs from original HTML file 100.

Typical solutions to phising include computing a hash value over the HTML codes corresponding to the HTML codes being displayed by the Web browser 120, and comparing the computed hash value to a hash value computed over the original HTML file 100. In one solution, the function UrlDowloadToFile( ) in Internet Explorer's URLMON library is used to read the data back in from disk. Unfortunately, the data read back is the parsed HTML file 150, not the original HTML file 100. For this reason validation results based on the parsed HTML file 150 could be erroneous. This is because hash codes are computed over the contents of an HTML file so the hash of original HTML file 100 will not match the hash of parsed HTML file 150.

In another solution, having to read the HTML codes back from persistent storage is avoided by calling the Internet Explorer® function CreateURLMoniker( ) and calling Imoniker's BindToStorage( ) function to retrieve the bytes via an IStream. The simpler Application Programming Interface (API) call UrlOpenStream( ) encapsulates this functionality. Unfortunately, this solution is inefficient as it requires re-downloading of the file. Additionally, the re-downloaded file is not the same physical file that is being displayed by the browser. For this reason, validation results based on the re-downloaded file could be erroneous.

A need exists in the art for an improved solution that allows an application program to verify the authenticity of pages displayed from an Internet site.

SUMMARY OF THE INVENTION

A Web page may be authenticated by issuing a Web page request from a browser on a client computer to a Web server, receiving a signed Web page in response to the request, authenticating the signed Web page, and invoking at least one client module associated with the Web server when the authenticating is successful. The at least one client module is adapted for execution on the client computer.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
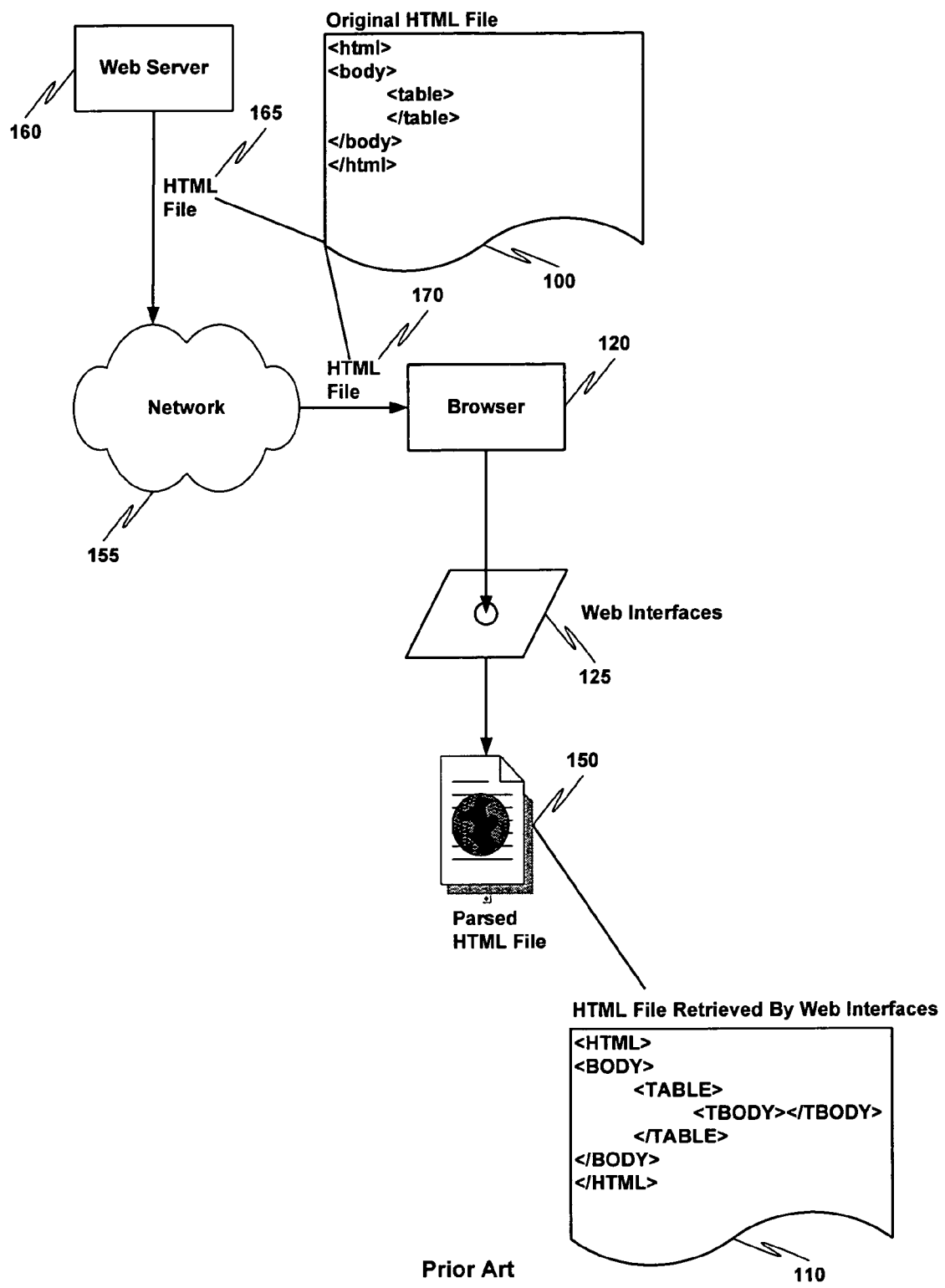
FIG. 1 is a block diagram that illustrates how an Internet Explorer® technology-enabled Web browser processes a Web page received from a Web server.

Embodiments of the present invention are described herein in the context of a multiple instruction execution mode resource-constrained device. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available form Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" comprises local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "identifier" describes one or more numbers, characters, symbols, or the like. More generally, an "identifier" describes any entity that can be represented by one or more bits.

Figure 2:
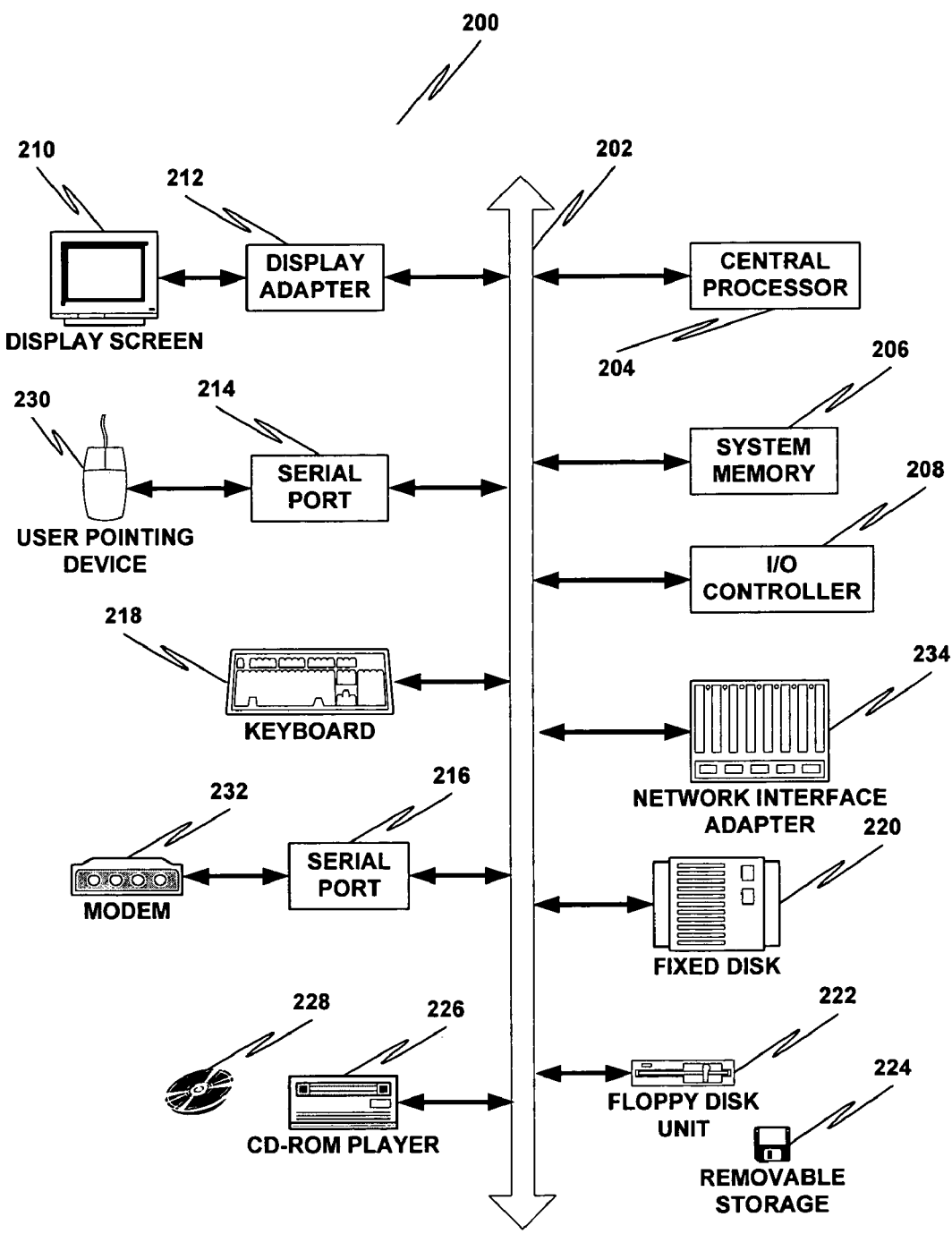
FIG. 2 is a block diagram of a computer system suitable for implementing aspects of the present invention.

FIG. 2 depicts a block diagram of a computer system 200 suitable for implementing aspects of the present invention. As shown in FIG. 2, computer system 200 comprises a bus 202 which interconnects major subsystems such as a central processor 204, a system memory 206 (typically RAM), an input/output (I/O) controller 208, an external device such as a display screen 210 via display adapter 212, serial ports 214 and 216, a keyboard 218, a fixed disk drive 220, a floppy disk drive 222 operative to receive a floppy disk 224, and a CD-ROM player 226 operative to receive a CD-ROM 228. Many other devices can be connected, such as a pointing device 230 (e.g., a mouse) connected via serial port 214 and a modem 232 connected via serial port 216. Modem 232 may provide a direct connection to a server via a telephone link or to the Internet via a POP (point of presence). Alternatively, a network interface adapter 234 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 2 to be present to practice the present invention, as discussed below. Furthermore, the devices and subsystems may be interconnected in different ways from that shown in FIG. 2. The operation of a computer system such as that shown in FIG. 2 is readily known in the art and is not discussed in detail in this application, so as not to overcomplicate the present discussion. Code to implement the present invention may be operably disposed in system memory 206 or stored on storage media such as fixed disk 220, floppy disk 224 or CD-ROM 228.

In an Internet Explorer® technology-enabled Web browser, a window object represents a browser window. A document object represents the HTML document in a given browser window. The document object is used to retrieve information about the document, to examine and modify the HTML elements and text within the document, and to process events. The document object corresponding to a particular window object may be obtained by calling the "Iunknown::QueryInterface" method with the "IID_IHTMLDocument" or "IID_IHTMLDocument2" interface identifier.

A persistent object implements one or more persistent object interfaces. Client applications use the persistent object interfaces to tell those objects when and where to store their state. The IPersistStreamInit interface is used to initialize a stream-based object and to save that object to a stream.

The IStream interface supports reading and writing data to stream objects. Stream objects contain the data in a structured storage object, where storage provides the structure. Simple data can be written directly to a stream, but most frequently, streams are nested within a storage object. They are similar to standard files. The IStream interface defines method similar to MS-DOS® operating system file functions. For example, each stream object has its own access rights and a seek pointer. The main difference between a stream object and an MS-DOS file is that streams are not opened using a file handle, but through an IStream interface pointer. The methods in this interface present an object's data as a contiguous sequence of bytes that can be read or written.

The CreateStreamOnHGlobal function creates a stream object in memory that supports the Istream Interface. The returned stream object supports both reading and writing. The GetHGlobalFromStream function retrieves the global memory handle to a stream that was created through a call to the CreateStreamOnHGlobal function.

Figure 3:
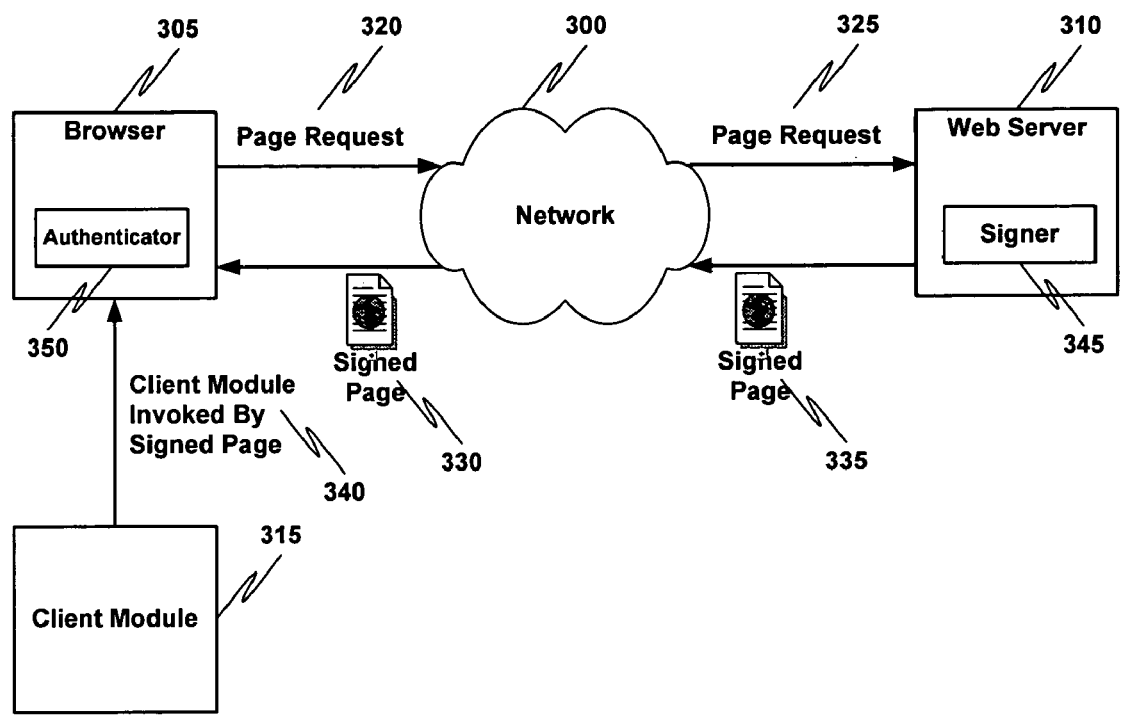
FIG. 3 is a block diagram that illustrates a system for authenticating a Web page in accordance with one embodiment of the present invention.

Turing now to FIG. 3, a block diagram that illustrates a system for authenticating a page in accordance with one embodiment of the present invention is presented. As shown in FIG. 3, a Web server 310 is communicatively coupled to a browser 305 via network 300. Browser 305 is adapted to issue a page request (320, 325) to Web server 310. Web server 310 receives the page request (320, 325) from browser 305 and signer 345 signs the requested page. Web server 310 is further adapted to send the signed page (335,330) to browser 305. Browser 305 is further adapted to receive the signed page (330, 335) and send it unaltered to authenticator 350. The means by which the browser sends an unaltered page to authenticator 350 is explained in more detail below, with reference to FIGS. 4-6. Authenticator 350 is adapted to receive the unaltered signed page and verify the authenticity of the signed page by computing an authenticator (e.g., hash value) over the contents of the signed page and comparing the. computed authenticator with the signature included or associated with the signed page (330, 335). Browser 305 is further adapted to invoke one or more client modules if the authenticity of the signed page (330, 335) is successfully verified.

Figure 3A:
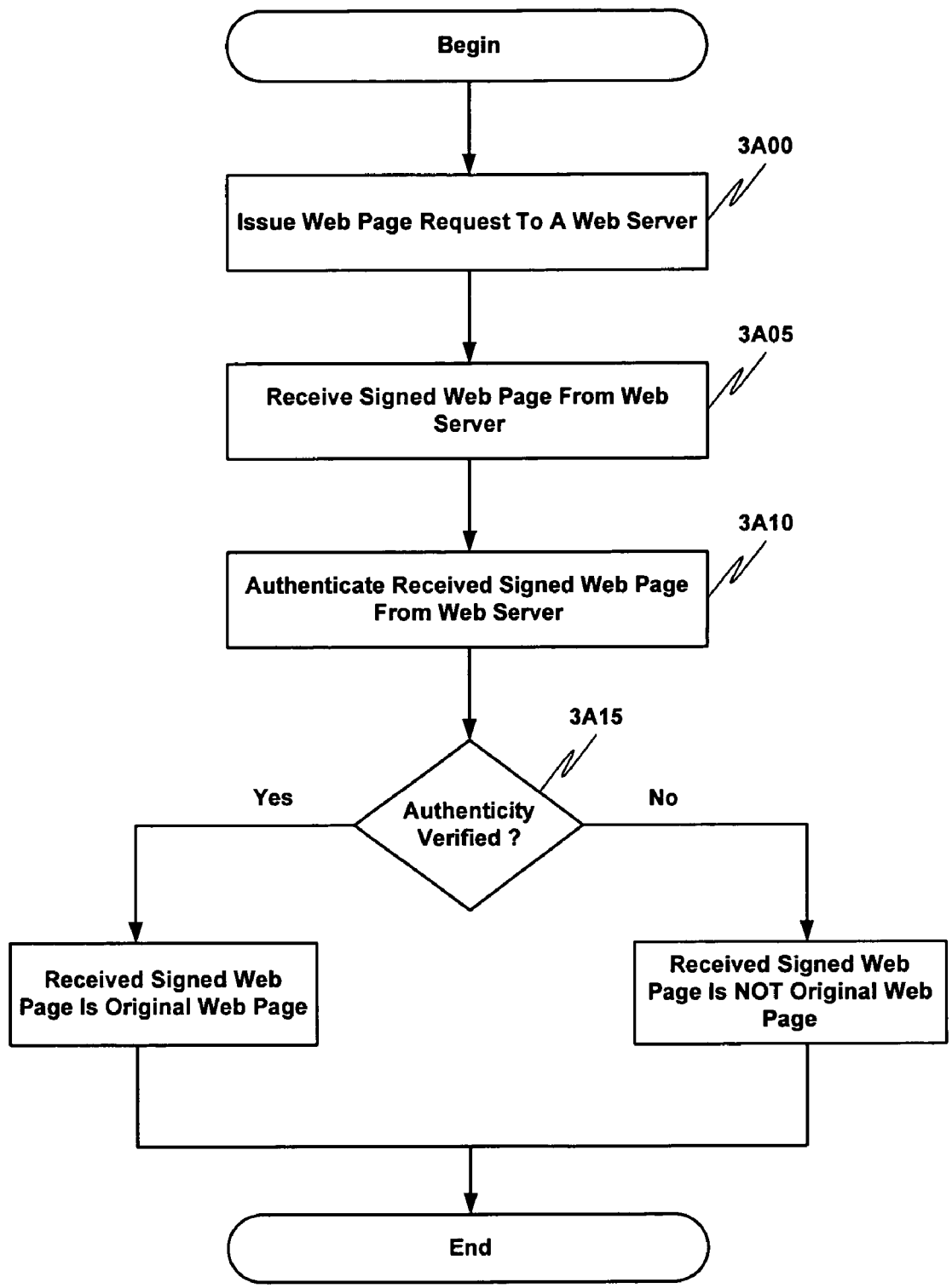
FIG. 3A is a flow diagram that illustrates a method for authenticating a Web page in accordance with one embodiment of the present invention.

Turing now to FIG. 3A, a flow diagram illustrating a method for authenticating a Web page in accordance with one embodiment of the present invention is presented. The method of FIG. 3A takes place in authenticator plug in 350 of FIG. 3. The processes illustrated in FIG. 3A may be implemented in hardware, software, firmware, or a combination thereof. At 3A00, a browser issues a Web page request to a Web server. At 3A05, a signed Web page from the Web serer is received in response to the page request issued at 3A00. At 3A10, the signed Web page from the Web server is authenticated by computing an authenticator (e.g., or hash value) over the contents of the signed page and comparing the computer authenticator with the signature included or associated with the signed page. At 3A15, a determination is made regarding whether the authenticity of the received signed Web page has been verified. If the authenticity of the received signed Web page has been successfully verified, an indication that the received signed page is the original Web page is made at 3A20. If the authenticity of the received signed page has not been successfully verified, an indication that the received signed page is not the original Web page is made at 3A25.

Figure 4:
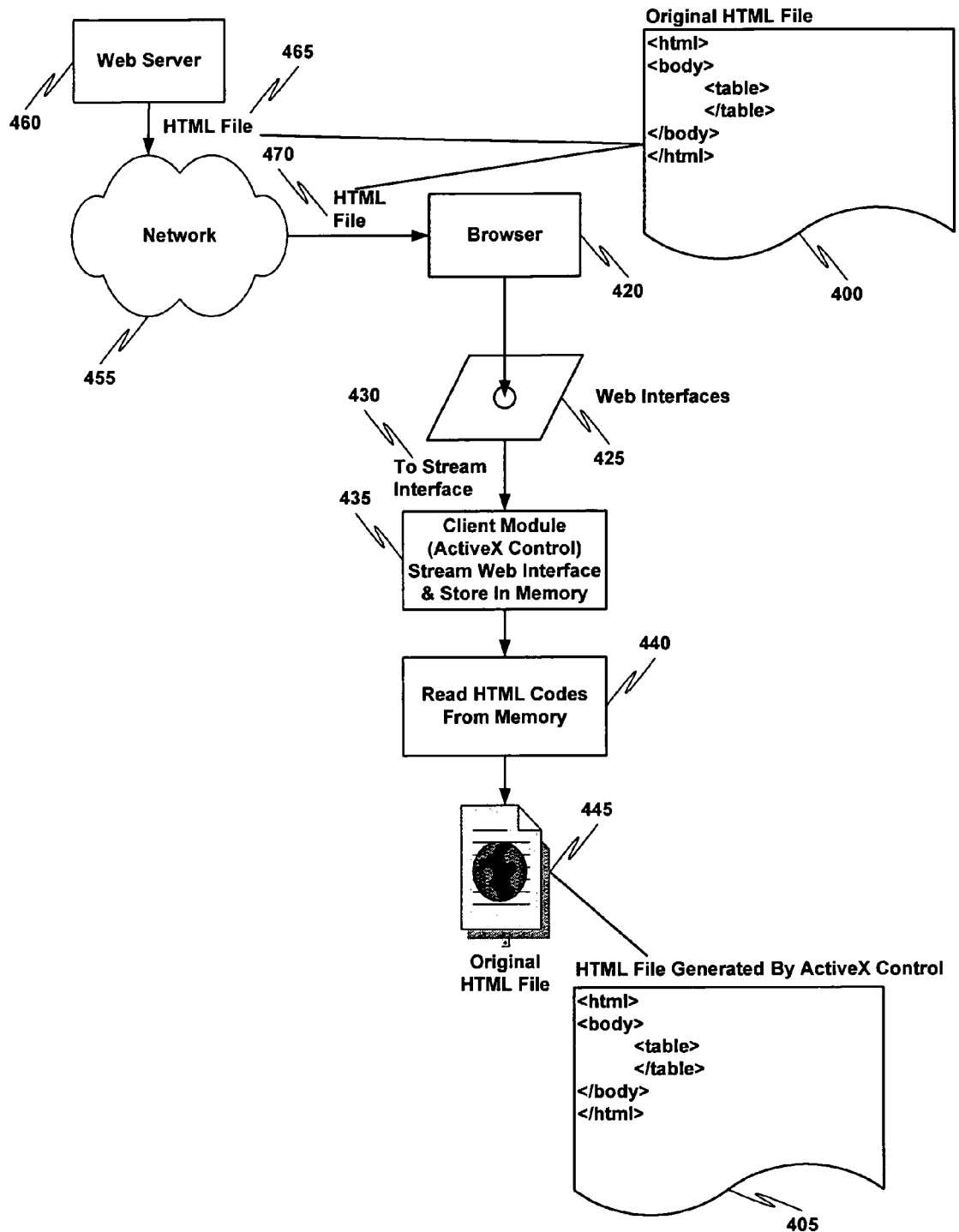
FIG. 4 is a block diagram that illustrates obtaining Web page HTML codes unmodified by a Web browser pre-parser in accordance with one embodiment of the present invention.

Turning now to FIG. 4, a block diagram that illustrates obtaining Web page HTML codes unmodified by a Web browser pre-parser in accordance with one embodiment of the present invention is presented. The unmodified codes may be used in authenticating the signed web page as discussed above with respect to reference numeral 3A10 of FIG. 3A. Original HTML file 400 represents an HTML file as received by browser 420 from a Web server 460. One or more Web interfaces 425 associated with the browser 420 are used to send HTML file 400 to a stream interface. At 435, a client module (reference numeral 315 of FIG. 3) streams the Web interface and stores the HTML codes in memory. At 440, the HTML codes are read from memory to produce an HTML file 405 having the same content as the original HTML file received by the browser 420.

Figure 5:
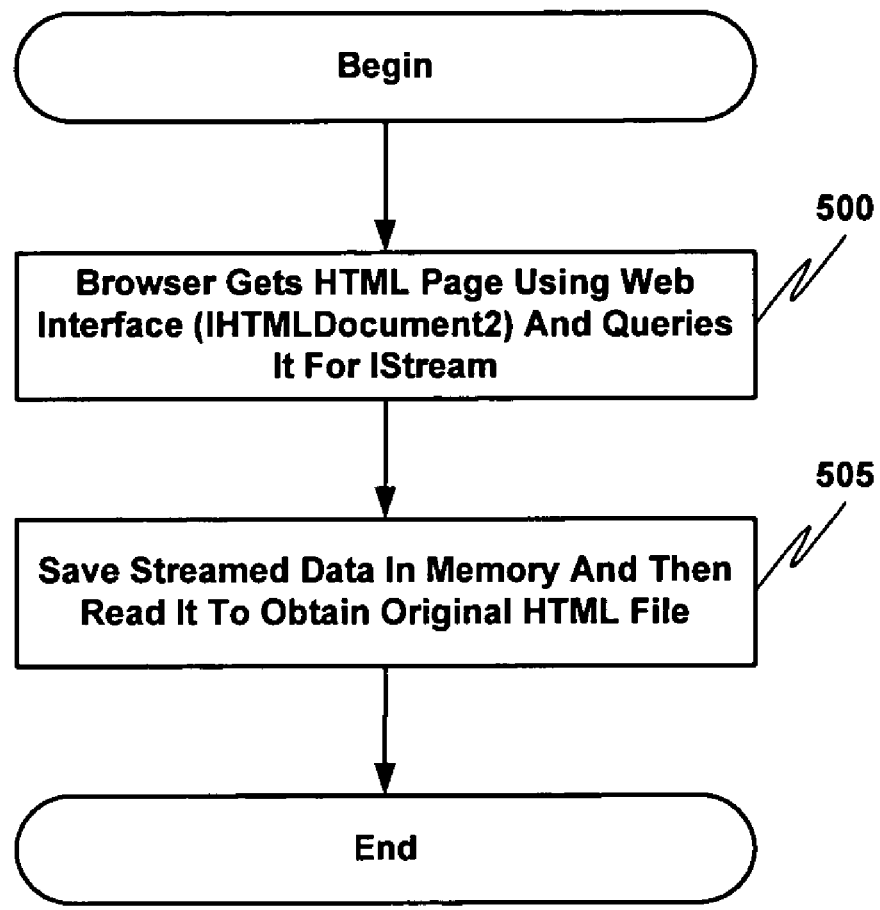
FIG. 5 is a high-level flow diagram that illustrates a method for obtaining Web page HTML codes unmodified by a Web browser pre-parser in accordance with one embodiment of the present invention.

Turning now to FIG. 5, a high-level flow diagram that illustrates a method for obtaining Web page HTML codes unmodified by a Web browser pre-parser in accordance with one embodiment of the present invention is presented. The method of FIG. 5 takes place in browser 420 of FIG. 4. The processes illustrated in FIG. 5 may be implemented in hardware, software, firmware, or a combination thereof. At 500, a Web browser obtains an HTML page using a Web interface and queries it for IStream. At 505, the streamed data is saved in memory and then read to obtain the original unmodified HTML file.

Figure 6:
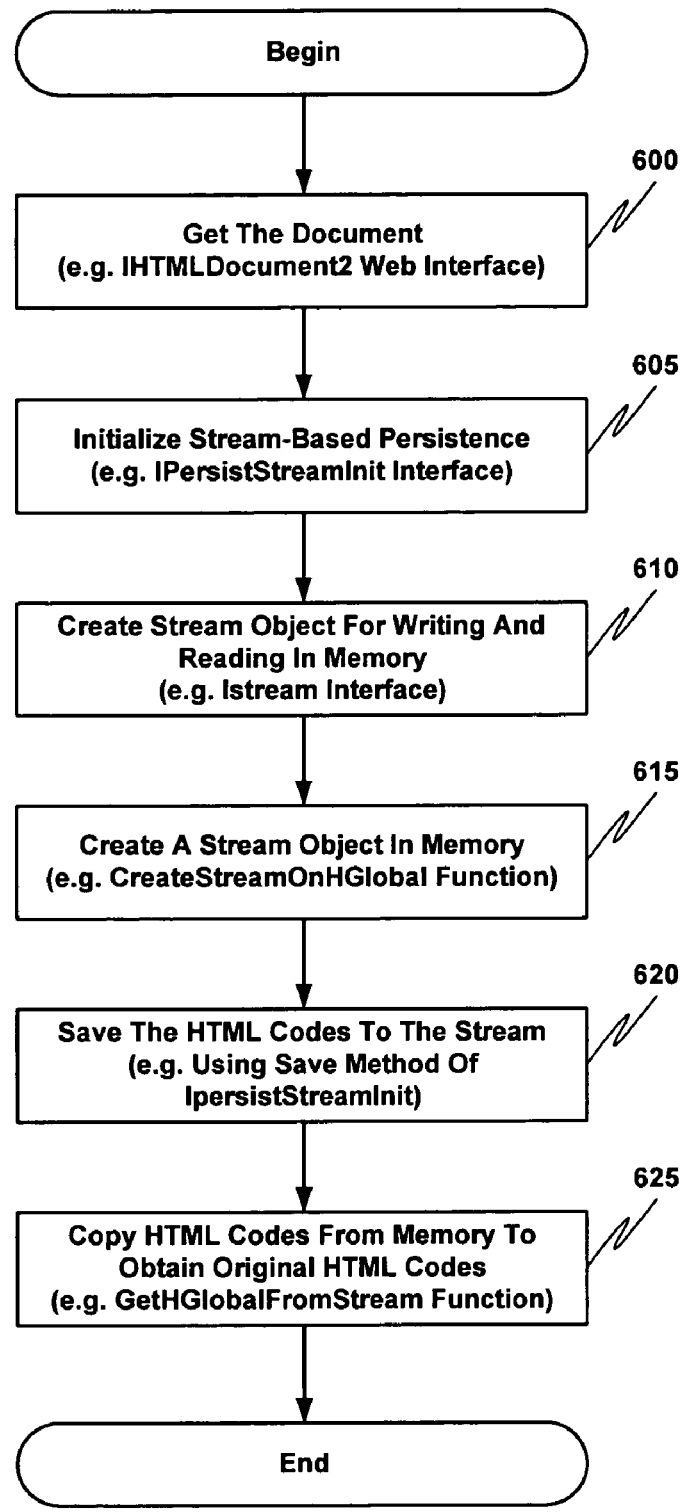
FIG. 6 is a detailed flow diagram that illustrates a method for obtaining Web page HTML codes unmodified by a Web browser pre-parser in accordance with one embodiment of the present invention.

Turning now to FIG. 6, a detailed flow diagram that illustrates a method for obtaining Web page HTML codes unmodified by a Web browser pre-parser in accordance with one embodiment of the present invention is presented. FIG. 6 takes place in browser 420 of FIG. 4 and provides more detail for FIG. 5. The processes illustrated in FIG. 6 may be implemented in hardware, software, firmware, or a combination thereof. At 600, the HTML document is obtained. According to one embodiment of the present invention, the HTML document is obtained using the "IHTMLDocument2" Web interface or its equivalent. At 605, stream-based persistence is initialized. According to one embodiment of the present invention, stream-based persistence is initialized using the "IpersistStreamInit" interface or its equivalent. At 610, a stream object is created for writing and reading in memory. According to one embodiment of the present invention, the stream object for writing and reading in memory is created using the "Istream" interface or its equivalent. At 615, a stream object is created in memory. According to one embodiment of the present invention, the stream object is created in memory using the "CreateStreamOnHGlobal" function or its equivalent. At 620, the HTML codes are saved to the stream. According to one embodiment of the present invention, the HTML codes are saved to the stream by using the "Save" method of IpersistStreamInit, or its equivalent. At 625, the HTML codes are copied from memory to obtain the original HTML codes. According to one embodiment of the present invention, the HTML codes are copied from memory using the "GetHGlobalFromStream" function or its equivalent.

Although aspects of the present invention have been illustrated with respect to HTML pages, those of ordinary skill in the art will recognize that the invention may be applied to other Web browser languages.

Although aspects of the present invention have been illustrated with respect to the Internet Explorer® Istream Interface, those of ordinary skill in the art will recognize that the invention may be applied to other Internet browsers and other interfaces with corresponding functionality.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for authenticating a Web page, comprising:
issuing a Web page request from a browser on a client computer to a Web server;
receiving a signed Web page in response to said request;
authenticating said signed Web page; and
invoking at least one client module associated with said Web server when said authenticating is successful, said at least one client module adapted for execution on said client computer, wherein:
said signed Web page comprises Hypertext Markup Language (HTML) code; and
said browser is an Internet Explorer® technology-enabled browser, wherein
said receiving comprises obtaining said signed Web page using an IHTMLDocument2 interface and querying said interface for streamed data; and
said authenticating comprises:
saving said streamed data in a memory; and
reading said memory to obtain an unaltered version of said signed Web page, wherein said saving comprises:
initializing stream-based persistence;
creating a stream object for writing and reading in said memory;
creating a stream object in said memory; and
saving said HTML codes to said stream.

2. The method of claim 1, wherein:
said initializing stream-based persistence comprises using an IPersisStreamInit interface;
creating a stream object for writing and reading in said memory comprises using an IStream interface;
creating a stream object in said memory comprises using a CreateStreamOnHGlobal function; and
saving said HTML codes to said stream comprises using a "Save" method of said IpersisStreamInit interface.

3. A method for obtaining an unaltered version of a Web page, comprising:
receiving a signed Web page in response to a request for said Web page, said request issued by a browser on a client computer;
querying a Web interface for streamed data;
saving said streamed data to a memory; and
reading said memory to obtain said unaltered version of said signed Web page, wherein:
said Web page comprises one or more Hypertext Markup Language (HTML) codes; and
said browser comprises an Internet Explorer® technology-enabled browser, wherein
said receiving comprising obtaining said Web page using an IHTMLDocument2 interface, wherein
said saving-comprises:
initializing stream-based persistence;
creating a stream object for writing and reading in said memory;
creating a stream object in said memory; and
saving said HTML codes to said stream.

4. The method of claim 3 wherein:
said initializing stream-based persistence comprises using an IPersisStreamInit interface;
said creating a stream object for writing and reading in said memory comprises using an IStream interface;
said creating a stream object in said memory comprises using a CreateStreamOnHGlobal function; and
said saving said HTML codes to said stream comprises using a "Save" method of said IpersisStreamInit interface.

5. A computer-readable storage device storing a program of instructions executable by the machine to perform a method to authenticate a Web page, the method comprising:
receiving a signed Web page in response to said issuing;
authenticating said signed Web page; and
invoking one or more client modules associated with said Web server if said authenticating is successful, said one or more client modules adapted for execution on said client computer, wherein:
said signed Web page comprises one or more Hypertext Markup Language (HTML) codes; and
said browser comprises an Internet Explorer® technology-enabled browser, wherein
said receiving comprises obtaining said signed Web page using an IHTMLDocument2 interface and querying said interface for streamed data; and
said authenticating comprises:
saving said streamed data in a memory; and
reading said memory to obtain an unaltered version of said signed Web page, wherein said saving comprises:
initializing stream-based persistence;
creating a stream object for writing and reading in said memory;
creating a stream object in said memory; and
saving said HTML codes to said stream.

6. The program storage device of claim 5, wherein:
said initializing stream-based persistence comprises using an IPersisStreamInit interface;
creating a stream object for writing and reading in said memory comprises using an IStream interface;
creating a stream object in said memory comprises using a CreateStreamOnHGlobal function; and
saving said HTML codes to said stream comprises using a "Save" method of said IpersisStreamInit interface.

7. A computer-readable storage device storing a program of instructions executable by the machine to perform a method to obtain an unaltered version of a Web page, the method comprising:
receiving a signed Web page in response to a request for said Web page, said request issued by a browser on a client computer;
querying a Web interface for streamed data;
saving said streamed data to a memory; and
reading said memory to obtain said unaltered version of said signed Web page, wherein:
said Web page comprises one or more Hypertext Markup Language (HTML) codes; and
said browser comprises an Internet Explorer® technology-enabled browser, wherein
said receiving comprises obtaining said Web page using an IHTMLDocument2 interface, wherein
said saving comprises:
initializing stream-based persistence;
creating a stream object for writing and reading in said memory;
creating a stream object in said memory; and
saving said HTML codes to said stream.

8. The program storage device of claim 7, wherein:
said initializing stream-based persistence comprises using an IPersisStreamInit interface;
said creating a stream object for writing and reading in said memory comprises using an IStream interface;
said creating a stream object in said memory comprises using a CreateStreamOnHGlobal function; and said saving said HTML codes to said stream comprises using a "Save" method of said IpersisStreamInit interface.

9. An apparatus for authenticating a Web page, said apparatus comprising:
means for issuing a Web page request from a browser on a client computer to a Web server;
means for receiving a signed Web page in response to said issuing;
means for authenticating said signed Web page; and
means for invoking one or more client modules associated with said Web server if said authenticating is successful, said one or more client modules adapted for execution on said client computer, wherein:
said signed Web page comprises one or more Hypertext Markup Language (HTML) codes; and
said browser comprises an Internet Explorer® technology-enabled browser, wherein
said means for receiving comprises means for obtaining said signed Web page using an IHTMLDocument2 interface and means for querying said interface for streamed data; and
said means for authenticating comprises:
means for saving said streamed data in a memory; and
means for reading said memory to obtain and unaltered version of said signed Web page, wherein
said means for saving comprises:
means for initializing stream-based persistence;
means for creating a stream object for writing and reading in said memory;
means for creating a stream object in said memory; and
means for saving said HTML codes to said stream.

10. The apparatus of claim 9, wherein:
said means for initializing stream-based persistence comprises means for using an IPersisStreamInit interface;
means for creating a stream object for writing and reading in said memory comprises using an IStream interface;
means for creating a stream object in said memory comprises using a CreateStreamOnHGlobal function; and
means for saving said HTML codes to said stream comprises using a "Save" method of said IpersisStreamInit interface.

11. An apparatus for obtaining an unaltered version of a Web page, said apparatus comprising:
means for receiving a signed Web pare in response to a request for said Web page, said request issued by a browser on a client computer;
means for querying a Web interface for streamed data;
means for saving said streamed data to a memory; and
means for reading said memory to obtain said unaltered version of said signed Web page, wherein:
said Web page comprises one or more Hypertext Markup Language (HTML) codes; and
said browser comprises an Internet Explorer® technology-enabled browser, wherein
said means for receiving comprises means for obtaining said Web page using an IHTMLDocument2 interface, wherein
said means for saving comprises:
means for initializing stream-based persistence;
means for creating a stream object for writing and reading in said memory;
means for creating a stream object in said memory; and
means for saving said HTML codes to said stream.

12. The apparatus of claim 11, wherein:
said means for initializing stream-based persistence comprises means for using an IPersisStreamInit interface;
means for creating a stream object for writing and reading in said memory comprises using an IStream interface;
means for creating a stream object in said memory comprises using a CreateStreamOnHGlobal function; and
means for saving said HTML codes to said stream comprises using a "Save" method of said IpersisStreamInit interface.

13. A client computer for authenticating a Web page, the apparatus comprising:
a memory;
a Web browser adapted to:
issue a Web page request to a Web server;
receive a signed Web page in response to said issuing; and
an authenticator adapted to authenticate said signed Web page, said Web browser further adapted to invoke one or more client modules associated with said Web server if said authenticator indicates successful authentication and said one or more client modules are adapted for execution on said client computer, wherein
said signed Web page comprises one or more Hypertext Markup Language (HTML) codes; and
said browser comprises an Internet Explorer® technology-enabled browser, wherein
said Web is browser is further adapted to:
obtain said Web page using an IHTMLDocument2 interface;
query said interface for streamed data;
save said streamed data in said memory; and
read said memory to obtain an unaltered version of said signed Web page, wherein
said Web browser is further adapted to save said streamed data by:
initializing stream-based persistence;
creating a stream object for writing and reading in said memory;
creating a stream object in said memory; and
saving said HTML codes to said stream.

14. The apparatus of claim 13 wherein said browser is further adapted to:
initialize said stream-based persistence using an IPersisStreamInit interface;
create said stream object for writing and reading in said memory using an IStream interface;
create a stream object in said memory using a CreateStreamOnHGlobal function; and
save said HTML codes to said stream using a "Save" method of said IpersisStreamInit interface.

15. A client computer for obtaining an unaltered version of a Web page, the apparatus comprising:
a memory; and
a Web browser adapted to:
receive a signed Web page in response to a request for said Web page;
query a Web interface for streamed data;
save said streamed data to said memory; and
read said memory to obtain said unaltered version of said signed Web page, wherein:
said Web page comprises one or more Hypertext Markup Language (HTML) codes; and
said browser comprises an Internet Explorer® technology-enabled browser, wherein
said browser is further adapted to
obtain said Web page using an IHTMLDocument2 interface, wherein said Web browser is further adapted to save said streamed data by:
    initializing stream-based persistence;
    creating a stream object for writing and reading in said memory;
    creating a stream object in said memory; and
    saving said HTML codes to said stream.

16. The apparatus of claim 15 wherein said browser is further adapted to:

initialize said stream-based persistence using an IPersisStreamInit interface;
create said stream object for writing and reading in said memory using an IStream interface;
create a stream object in said memory using a CreateStreamOnHGlobal function; and
save said HTML codes to said stream using a "Save" method of said IpersisStreamInit interface.

* * * * *

UNITED STATES PATENT AND TRADEMARK OFFICE
CERTIFICATE OF CORRECTION

PATENT NO. : 7,565,543 B1
APPLICATION NO. : 11/088623
DATED : July 21, 2009
INVENTOR(S) : Ajit S. Mungale It is certified that error appears in the above-identified patent and that said Letters Patent is hereby corrected as shown below:

SHEET 7 OF 7:

FIGURE 6, "IpersistsStreamInit)" should read --IPersistStreamInit)--.

COLUMN 2:

Line 12, "phising" should read --phishing--; and
    Line 17, "UrlDowloadTofile( )" should read --UrlDownloadTofile( )--.

COLUMN 4:

Line 2, "Solaris®" should read --Solaris®,--; and
    Line 4, "available form" should read --available from--.

COLUMN 5:

Line 23, "Turing now" should read --Turning now--;
    Line 31, "(335,330)" should read --(335, 330)--;
    Line 38, "(e.g., hash" should read --(e.g., a hash--;
    Line 40, "the. computed" should read --the computed--;
    Line 45, "Turing now" should read --Turning now--;
    Line 48, "plug in 350" should read --350--; and
    Line 52, "Web serer" should read --Web server--.

COLUMN 6:

Line 38, "IpersistStreamInit," should read --IPersistStreamInit,--; and
    Line 49, "IpersistStreamInit," should read --IPersistStreamInit,--.

COLUMN 7:

Line 12, "adapted" should read --being adapted--;
    Line 38, "IpersisStreamInit" should read --IPersistStreamInit--;
    Line 52, "comprising" should read --comprises--; and
    Line 54, "saving-comprises:" should read --saving comprises:--.

COLUMN 8:

Line 2, "IpersisStreamInit" should read --IPersistStreamInit--;
    Line 37, "IpersisStreamInit" should read --IpersistStreamInit--; and
    Line 43, "issued" should read --being issued--.

CERTIFICATE OF CORRECTION (continued)
U.S. Pat. No. 7,565,543 B1

COLUMN 9:

Line 2, "IpersisStreamInit" should read --IPersistStreamInit--;
Line 13, "adapted" should read --being adapted--;
Line 25, "obtain and" should read --obtain an--;
Line 41, "IpersisStreamInit" should read --IPersistStreamInit--;
Line 45, "Web pare" should read --Web page--; and
Line 46, "issued" should read --being issued--.

COLUMN 10:

Line 6, "IpersisStreamInit" should read --IPersistStreamInit--; and
Line 48, "IpersisStreamInit" should read --IPersistStreamInit--.

COLUMN 12:

Line 8, "IpersisStreamInit" should read --IPersistStreamInit--.

Signed and Sealed this

Second Day of February, 2010

David J. Kappos
*Director of the United States Patent and Trademark Office*